United States Patent [19]

Cassidy

[11] 4,046,581

[45] Sept. 6, 1977

[54] REFRACTORY BINDER

[75] Inventor: John Edward Cassidy, Runcorn, England

[73] Assignee: Imperial Chemical Industries Limited, London, England

[21] Appl. No.: 483,906

[22] Filed: June 27, 1974

[30] Foreign Application Priority Data

July 17, 1973 United Kingdom ............... 33916/73

[51] Int. Cl.² .............................................. C04B 19/00
[52] U.S. Cl. ........................................ 106/85; 106/65
[58] Field of Search .................................... 106/85, 65

[56] References Cited

U.S. PATENT DOCUMENTS

| 3,804,648 | 4/1974 | Birchall et al. ...................... 106/56 |
| 3,899,342 | 8/1975 | Birchall et al. ...................... 106/65 |

*Primary Examiner*—J. Poer
*Attorney, Agent, or Firm*—Cushman, Darby & Cushman

[57] ABSTRACT

A solution of an aluminium phosphate binder in a diluent, and refractory compositions containing the solution, the solution comprising aluminium ions and phosphate ions in a molar ratio of Al:P of 0.8:1 to 1.2:1 and other acidic anions (other than oxyphosphorus acid anions), the molar ratio of other acidic anions: Al being in the range 1.3:1 to 2:1.

7 Claims, No Drawings

REFRACTORY BINDER

This invention relates to binders for refractory materials and to refractory compositions containing the binder.

In our patent specifications British patent specifications Nos. 1,322,724 and 1,357,541 we have described halogen-containing, and especially chlorine-containing, complex phosphates of aluminium, their preparation, and their use as binders in refractory compositions. Those of the binders which contain aluminium and phosphorus in a molar ratio of substantially 1:1 decompose to give a refractory product most readily. Moreover, refractories bonded with binders which have this ratio of aluminium:phosphorus have been found to show good slag resistance and spalling resistance. Consequently, the halogen-containing, and especially the chlorine-containing, aluminium phosphate binders which contain aluminium and phosphorus in a molar ratio of substantially 1:1 are preferred. The binders specifically described generally contain halogen and aluminium in a molar ratio of substantially 1:1, and the specifications teach that this is the preferred ratio.

In our copending application 48576/71, 26803/72, now published as West German Patent Application No. 2251313, we have also described binders which are complex phosphates of aluminium and which contain additional anions of a carboxylic acid or of a mineral oxyacid. In these complex phosphates the preferred molar ratio of aluminium to phosphorus is also substantially 1:1 and the molar ratio of additional anions to aluminium is generally substantially 1:1 which is said to be preferred, although a range of 0.5:1 to 1.2:1 is described.

Surprisingly, in view of the teaching of the earlier specifications, we have now found that improved bonding of refractory material by complex phosphates of aluminium may be achieved by increasing the molar ratio of additional anion (which may be halide):aluminium in the binder which is used. The bonded refractory products produced from the refractory material in general have improved strength as shown by improved cold and hot moduli.

According to the present invention there is provided a solution of aluminium phosphate binder in a diluent the solution comprising aluminium ions and phosphate ions in a molar ratio of Al:P of substantially 1:1 (as hereinafter defined) and other acidic anions (other than oxyphosphorus acid anions), the molar ratio of other acidic anions:Al being in the range of 1.3:1 to 2:1.

By an Al:P molar ratio of substantially 1:1 is meant a ratio in the range 0.8:1 to 1.2:1. Preferably this latter ratio is in the range 0.95:1 to 1.05:1.

The other acidic anions, that is the acidic anions other than oxyphosphorus acid anions and which are hereinafter referred to as the acid anions, may be selected from carboxylic acid anions and mineral acid anions. For example, the carboxylic acid anions, which may be the anions of a polycarboxylic acid, may be anions of citric acid or oxalic acid.

The mineral acid anions may be halide ions, and especially chloride ions which are preferred. The mineral acid may be a mineral oxyacid and the corresponding acid anions may be, for example, nitrate, sulphate or chlorate. The solution may contain, in addition to the phosphate ions, a mixture of two or more different acid anions.

The phosphate is preferably orthophosphsphate.

In a further embodiment of the present invention there is also provided a refractory composition which is a slurry or a paste and which comprises a particulate refractory material and a solution of an aluminium phosphate binder in a diluent the solution comprising aluminium ions and phosphate ions in a molar ratio of Al:P of substantially 1:1 (as hereinbefore defined) and other acidic anions (other than oxyphosphorus acid anions), the molar ratio of other acidic anions:Al being at least 1.3:1 and less than 2.4:1.

By increasing the molar ratio of acid anion:Al the cold strength of the resultant bonded refractory may be increased although we find that the cold strength may begin to fall off above a ratio of about 1.7:1, especially when the acid anion is chloride. Furthermore, the higher the acid anion content the more corrosive the binder solution and the less convenient it is to store and to handle. Thus, for general use, the binder solution in the refractory composition should have an acid anion:Al molar ratio below 2.4:1, and preferably has a ratio in the range 1.4:1 to 2:1; especially good results may be achieved using a ratio in the range 1.5:1 to 1.9:1.

The diluent in the binder solution may be an aqueous diluent and preferably consists substantially of water although the diluent may consist in part of a non-aqueous medium.

The solution of aluminium phosphate binder may be prepared in a number of ways, for example, by mixing a solution of an appropriate aluminium salt, for example, an aluminium halide, e.g. aluminium chloride, with phosphoric acid in a suitable diluent and, if necessary, removing from the solution the necessary amount of acid of the additional anion, e.g. hydrogen halide, to produce a solution having a molar ratio of acid anion:Al in the desired range. The acid of the additional anion may be removed, for example, by evaporation. A method which facilitates ready control of the acid anion content of the solution involves forming a solution of aluminium hydroxide, phosphoric acid and the acid of the anion, e.g. hydrochloric acid, in a suitable diluent, the molar ratio of the acid anion:Al being controlled by controlling the amount of the acid of the anion which is added to the solution. Conveniently, the aluminium hydroxide is heated under reflux with the acid of the anion, e.g. hydrochloric acid, the phosphoric acid is added and refluxing is continued to give a clear solution.

In other methods in which the acid anion is a halide a solution of aluminium hydroxy halide may be reacted with appropriate proportions of hydrogen halide and phosphoric acid, and a solid halogen-containing complex phosphate of aluminium containing chemically-bound water, as described in our British Patent Specification No. 1,322,724, may be dissolved in a solution of hydrogen halide to give the desired solution.

In the above methods the molar ratio of Al:P can be controlled by control of the relative amounts of aluminium compound and phosphoric acid used in the preparation.

The solutions of the invention may be supplied in concentrations at which they are to be used, or may be supplied in more concentrated form, for example as saturated solutions and diluted before use in the production of slurries. Generally, solutions will have a binder concentration of at least 5% and preferably 10% to 50% by weight expressed as the total of aluminium and phosphate.

The amount of aluminium phosphate binder used in the refractory composition depends on the amount of refractory material to be bound. Generally, only a small proportion of binder, relative to the refractory material, is necessary. For example, the binder may be used in an amount of 1% to 25% by weight, especially 2% to 10% by weight (expressed as total of aluminium and phosphate), based on the refractory material, although quantities of binder above or below these limits may be used.

The amount of diluent in the refractory composition depends on the consistency required which, in turn, depends on the use for which the slurry or paste is intended. For example, a thinner mix will generally be used for a mortar than for a concrete. Usually, there will be sufficient diluent present to dissolve at least a major proportion (and preferably all) the aluminium phosphate binder. For example, the composition will generally contain between 1% and 30%, preferably between 4% and 20%, by weight of diluent based on the weight of refractory material.

The nature of the refractory material in the refractory composition will depend on the purpose for which the composition is intended; whether it is required as a mortar or cement, and whether it is required to be acidic or basic. The aluminium phosphate binder is generally most useful when binding acid or neutral refractory materials, especially metal oxides and silicates, for example alumina, zirconia and aluminium silicate and zirconium silicate. Further examples of refractory materials which may be used include mica, mullite, silica, silicon carbide, silicon nitride and graphite. Mixtures of two or more refractory materials may be used if desired. Refractory materials consisting of mixtures of coarse and fine particles are preferred since the strengths of the products obtained using such mixtures are generally higher than when all the particles used are of similar size.

The particulate material in the refractory composition may be bound together by causing or allowing the composition to set. The setting of the composition may be effected by heating. The exact temperature required in any particular case will depend upon the composition of the binder and especially upon the nature of the acid anions in the binder. The precise temperature is generally not critical although a temperature of at least 80° C, and generally a temperature in the range 80° to 200° C, will be found to be satisfactory. Higher or lower temperatures may be used if desired.

Alternatively, the refractory composition may be caused to set up in the cold by use of a setting agent which reacts with the acid anions present. Thus, the setting agent should be basic, e.g. magnesium oxide. The use of preferred forms of magnesium oxide as a setting agent for aluminium phosphate binders is described in detail in our copending British Patent Application Nos. 23885/72, 31474/73, now published as West German Patent Application No. 2325973.

As the refractory composition contains an excess of acid anion over aluminium ions more reactive forms of magnesium oxide or setting agents more reactive then magnesium oxide may be required if the setting time is not to be unduly long. Other suitable setting agents include calcium oxide and dicalcium silicate.

After setting, the bound refractory material may be fired at an elevated temperature in order that the material may develop its full strength. A suitable temperature is between 800° and 1200° C.

The invention is illustrated by the following Examples in which all parts and percentages are by weight unless otherwise stated.

EXAMPLE 1

A solution of an aluminium phosphate binder was made by adding concentrated aqueous (36%) hydrochloric acid solution to dry aluminium hydroxide and heating the resultant mixture for 2 hours at a temperature not greater than 90° C, and then adding aqueous (88%) orthophosphoric acid solution from a dropping funnel over a period of ½-hour and refluxing the mixture for 4 hours. The orthophosphoric acid was used in an amount sufficient to give an aluminium:phosphorus molar ratio in the binder solution of 1:1 whilst the hydrochloric acid was used in an amount sufficient to give a chlorine:aluminium molar ratio of 1.3:1.

The above procedure was repeated several times using increased proportions of hydrochloric acid solution to prepare other binder solutions in which the chlorine to aluminium molar ratio was 1.4:1, 1.5:1, 1.6:1 and 2:1.

Each of the resultant solutions was diluted with water to provide binder solutions containing 26% of binder expressed as the total weight of aluminium and phosphate.

Separate slurries were formed from 100 parts of each binder solution and 1000 parts of a refractory mix containing 95.6% of graded alumina, 4% of high alumina ball clay and 0.4% of magnesium oxide of low surface area (commercially available as Magnorite 100F). The slurries were charged to separate moulds and allowed to stand at room temperature until set and then dried by heating at 110° C for 2 hours. The samples were then recovered from the moulds and the modulus of rupture of each sample was measured at room temperature. The results are shown in Table 1.

Table 1

| Solution | Cl:Al (molar ratio) | Average Modulus of Rupture (pounds force per square inch) | Standard Deviation |
|---|---|---|---|
| 1 | 2.0:1 | 1130 | 95.1 |
| 2 | 1.6:1 | 1462 | 59.0 |
| 3 | 1.5:1 | 1267 | 145.8 |
| 4 | 1.4:1 | 1022 | 88.7 |
| 5 | 1.3:1 | 1125 | 73.6 |

By way of comparison the above procedure was repeated in three separate experiments except that in the binder solutions which were used the molar ratios of chlorine:aluminium were 1.0:1, 1.2:1 and 3.0:1 respectively. The average modulus of rupture in pounds force per square inch measured at room temperature of the samples produced using these binder solutions were 656, 770 and 779 respectively, with standard deviations of 52.3, 39.3 and 50.6 respectively.

In a further experiment the sample produced using binder solution 2 was fired at 900° C for 2 hours. The hot modulus of rupture was 2308 pounds force per square inch with a standard deviation of 243.8. By way of comparison the hot modulus of rupture of a sample prepared following the above procedure except that the binder solution used had a chlorine:aluminium molar ratio of 1.2:1 was 1515 pounds force per square inch with a standard deviation of 69.8.

EXAMPLE 2

Two separate portions of 3000 parts of graded alumina-silicate grog (containing approximately 60% $Al_2O_3$) were mixed with, respectively, (i) 300 parts of solution 2 as used in Example 1 and 240 parts of water, and (ii) 450 parts of solution 2 as used in Example 1 and 150 parts of water.

The resultant slurries were thoroughly mixed and cast into half-inch thick slabs.

The slabs were dried for 7 days at room temperature, for 2 days at 110° C, and then fired for 2 hours at 1300° C. After cooling, the slabs were cut up to give specimens for hot modulus of rupture testing. The results are given in Table 2.

Table 1

| Formulation | Temperature of Test (° C) | Modulus of Rupture (pounds force per square inch) | Standard Deviation |
|---|---|---|---|
| (i) | 600 | 1647 | 104 |
|  | 800 | 1726 | 241 |
|  | 1000 | 1178 | 8 |
|  | 1100 | 507 | 265 |
|  | 1200 | 321 | 56 |
|  | 1400 | 83 | 7 |
| (ii) | 600 | 1425 | 291 |
|  | 800 | 1705 | 290 |
|  | 1000 | 1310 | 273 |
|  | 1100 | 344 | 66 |
|  | 1200 | 251 | 41 |
|  | 1400 | 65 | 10 |

Small amounts of each of the slurries were used as the mortar in joints between pairs of firebricks. The joints were cured by heating as described above and tested for modulus of rupture at room temperature.

Formulation (i) modulus of rupture = 13 pounds force per square inch.

Formulation (ii) modulus of rupture = 65 pounds force per square inch.

EXAMPLE 3

Five separate refractory compositions were made up using in each case a binder solution the same as solution 2 of Example 1.

The refractory compositions were made up from the following components by dry-mixing the components for 5 minutes then adding the binder solution and mixing for a further 5 minutes.

Table 3

| Component | Parts A | B | C | D | E |
|---|---|---|---|---|---|
| Graded tabular alumina | 96 | 96 | 96 | 96 | 96 |
| High alumina ball clay | 4 | 4 | 4 | 4 | 4 |
| Binder solution | 10 | 10 | 10 | 10 | 10 |
| Magnesium oxide* | 0.4 | 0.4 | 0.4 | 0.4 | 0.4 |
| Dead burnt calcium oxide | 0.1 | — | — | — | — |
| Dicalcium silicate | — | — | 0.1 | — | — |
| Hexamine | — | — | — | 0.3 | — |
| Olivine | — | 1.0 | — | — | — |

*300R fused magnesia (Thermal Syndicate).

Samples of each composition were charged to separate moulds and allowed to stand at room temperature until set. The setting times and the hot modules of rupture at various temperatures are given in Table 4.

Table 4

|  | A | B | C | D | E |
|---|---|---|---|---|---|
| Setting time (hrs) | 8 | 5 | 6 | 6 | <24 |
| Hot. M.O.R. pound force per square inch |  |  |  |  |  |
| 800° C | 1671 | 1325 | 1363 | 1124 | 1900 |
| 1000° C | 660 | 1292 | 715 | 1059 | 1700 |
| 1200° C | 40 | 32 | 36 | 26 | 55 |

EXAMPLE 4

A solution of an aluminium phosphate binder was made by adding concentrated nitric acid to dry aluminium hydroxide and heating the resulting mixture for 3 hours at a temperature of about 90° C. Aqueous (88%) orthophoshoric acid solution was then added from a dropping funnel over a period of 1 hour and the mixture was refluxed for a further 5 hours. The orthophosphoric acid was used in an amount sufficient to give an Al:P ratio in the binder solution of 1:1 whilst the nitric acid was used in an amount sufficient to give a molar ratio of $NO_3$:Al of 1.5:1.

The solution was diluted with water to give a solution containing 26% of binder expressed as the total weight of aluminium and phosphate. The solution was clear and had a density of 1.47g/cc.

The procedure was repeated using less nitric acid. The resultant solution was diluted with water to provide a solution containing 26% by weight of aluminium plus phosphate and a molar ratio of $NO_3$:Al of 1.3:1.

100 parts of each solution were used to make up a slurry with 1000 parts of a mix containing 95.6% of graded tubular alumina, 4% high alumina ball clay and 0.4% of low surface area magnesium oxide (commercially available as Magnorite 100F).

Samples of each mix were then charged to a mould, allowed to set at room temperature and then heated at 110° C for 2 hours.

Table 5

| Solution | $NO_3$:Al (molar ratio) | Setting time (hrs) | M.O.R. after drying 110° C pounds force per sq. inch | Hot M.O.R. at 900° C pounds force per sq. inch |
|---|---|---|---|---|
| 1 | 1.3 | 24 | 1145 (77) | 1291 (123) |
| 2 | 1.5 | 48 | 875 (50) | 1067 (181) |

Figures in parenthesis are standard deviations.

EXAMPLE 5

The procedure of Example 3 was repeated using compositions as shown in Table 5.

Table 6

| Component | Parts A | B |
|---|---|---|
| Graded tabular alumina | 96 | 96 |
| High alumina ball clay | 4 | 4 |
| Binder solution* | 10 | 10 |
| Magnesium oxide** | 0.5 | 0.6 |

*Solution 2 as used in Example 1.
**300R fused magnesia (Thermal Syndicate)

The setting times of the compositions and the properties of the products are given in Table 7.

Table 7

|  | A | B |
|---|---|---|
| Setting times (hrs) | 4 | 3 |
| Hot M.O.R. pounds force per square inch |  |  |
| 800° C | 1724 | 1515 |
| 1000° C | 1597 | 1407 |
| 1200° C | 56 | 40 |

Table 7-continued

| | A | B |
|---|---|---|
| Cold crushing strength pounds force per square inch | | |
| 1 | 717 | 1165 |
| 2 | 4189 | 3830 |

1. After drying at room temperature for 24 hours
2. After drying at 110° C for 24 hours

I claim:

1. A solution of an aluminium phosphate binder in a diluent the solution comprising aluminium ions and phosphate ions in a molar ratio of Al:P of substantially 1:1 and other inorganic acidic anions, other than oxyphosphorus acid anions, the molar ratio of other acidic anions:Al being in the range 1.3:1 to 2:1.

2. A solution as claimed in claim 1 in which the other acidic anions are selected from mineral acid anions.

3. A solution as claimed in claim 2 in which the other acidic anions are or include halide ions.

4. A solution as claimed in claim 3 in which the halide ions are or include chloride ions.

5. A solution as claimed in claim 1 in which the molar ratio of other acidic anions:Al is in the range 1.5:1 to 1.9:1.

6. A solution as claimed in claim 1 in which the concentration of binder in the solution, expressed as the total of aluminium and phosphate, is at least 5% by weight.

7. A solution as claimed in claim 6 in which the concentration of binder is in the range 10% to 50% by weight.

* * * * *